United States Patent
Bachner et al.

(10) Patent No.: US 11,584,312 B2
(45) Date of Patent: Feb. 21, 2023

(54) MOTOR VEHICLE

(71) Applicant: Bayerische Motoren Werke Aktiengesellschaft, Munich (DE)

(72) Inventors: Josef Bachner, Mainburg (DE); Sven Barsch, Germering (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 18 days.

(21) Appl. No.: 17/267,442

(22) PCT Filed: Jul. 22, 2019

(86) PCT No.: PCT/EP2019/069689
§ 371 (c)(1),
(2) Date: Feb. 9, 2021

(87) PCT Pub. No.: WO2020/030417
PCT Pub. Date: Feb. 13, 2020

(65) Prior Publication Data
US 2021/0316672 A1    Oct. 14, 2021

(30) Foreign Application Priority Data
Aug. 10, 2018 (DE) .................... 10 2018 213 520.7

(51) Int. Cl.
*B60R 13/07* (2006.01)
(52) U.S. Cl.
CPC .................... *B60R 13/07* (2013.01)
(58) Field of Classification Search
CPC .................. B60R 13/07; B62D 25/07
See application file for complete search history.

(56) References Cited

U.S. PATENT DOCUMENTS

| | | | | |
|---|---|---|---|---|
| 3,596,980 | A | * | 8/1971 | Cadiou .................. B62D 25/07 49/476.1 |
| 4,618,181 | A | * | 10/1986 | Tokuda .................. B62D 25/07 296/213 |
| 5,333,554 | A | | 8/1994 | Yamada et al. |
| 6,854,767 | B2 | * | 2/2005 | Yakata .................. B62D 25/07 280/808 |
| 7,290,831 | B2 | * | 11/2007 | Poss ....................... B62D 25/06 296/210 |

(Continued)

FOREIGN PATENT DOCUMENTS

| | | |
|---|---|---|
| CN | 102762461 A | 10/2012 |
| CN | 103347741 A | 10/2013 |

(Continued)

OTHER PUBLICATIONS

PCT/EP2019/069689, International Search Report dated Sep. 18, 2019 (Two (2) pages).

(Continued)

*Primary Examiner* — Jason S Morrow
(74) *Attorney, Agent, or Firm* — Crowell & Moring LLP

(57) ABSTRACT

A water channel structure for a motor vehicle includes a water channel side wall where the water channel side wall has an overlap region which is arrangeable in the motor vehicle overlapping a side wall of a motor vehicle body in an overlap plane. A set-off region is disposed on the overlap region where at least a part of the set-off region is spaced apart from the overlap plane.

5 Claims, 5 Drawing Sheets

(56) References Cited

U.S. PATENT DOCUMENTS

| | | | | |
|---|---|---|---|---|
| 8,020,354 B2* | 9/2011 | Scroggie | ................ | B60R 13/04 52/716.2 |
| 10,549,390 B2* | 2/2020 | Busier | ................... | B62D 65/02 |
| 11,091,204 B2* | 8/2021 | Nakayama | ............ | B62D 27/023 |
| 2010/0066129 A1* | 3/2010 | Edwards | ................ | B60R 13/07 296/208 |
| 2018/0105211 A1* | 4/2018 | Jarvis | .................... | B62D 25/07 |

FOREIGN PATENT DOCUMENTS

| | | |
|---|---|---|
| CN | 203544140 U | 4/2014 |
| DE | 10 2014 201 146 A1 | 7/2015 |
| JP | 62-189285 U | 12/1987 |
| JP | 63-2650 U | 1/1988 |
| JP | 63-164085 U | 10/1988 |
| JP | 2-16318 U | 2/1990 |

OTHER PUBLICATIONS

German Search Report issued in German application No. 10 2018 213 520.7 dated Apr. 26, 2019, with Statement of Relevancy (Seven (7) pages).

English-language Chinese Office Action issued in Chinese application No. 201980046630.3 dated Jun. 6, 2022 (Five (5) pages).

* cited by examiner

MOTOR VEHICLE

BACKGROUND AND SUMMARY OF THE INVENTION

The invention relates to a water channel structure for a motor vehicle.

The prior art has disclosed water channel structures which are arranged for example in the region of the trunk below a trunk lid. Here, the water channel structures are, for example, welded to a side wall of the motor vehicle body. The water channel structures and the side wall of the motor vehicle body are in this case for example in the form of metal sheets. PVC, for example, is applied to the elements at a later stage so as to ensure leak-tightness with respect to water.

The side wall of the motor vehicle body is furthermore shaped so as to define the desired external shape of the motor vehicle. In this case, the side wall of the motor vehicle body may for example be of angled form. Since the water channel structures are arranged in the shaping region of the side wall of the motor vehicle body, the water channel structures influence the external shape of the side wall of the motor vehicle body to the extent that not all the surface radii (character lines) of the side wall of the motor vehicle body that are desired in terms of design are able to be provided. In this case, for example, currently only flat rear fairings can be manufactured and sealed off using conventional methods (without additional expenditure for special processes, such as for example soldering).

It is therefore an object of the invention to provide a water channel structure which allows prominent stylistic features or smaller surface radii of character edges of side walls of the motor vehicle body, and also to realize sealing with respect to water with minimal tolerance regions.

According to the invention, the object is achieved by a water channel structure for a motor vehicle that comprises a water channel side wall having an overlap region, wherein the overlap region is suitable for being arranged in the motor vehicle in a manner overlapping a side wall of a motor vehicle body in an overlap plane E, and a set-off region arranged on the overlap region, wherein the set-off region is formed in such a way that at least one part of the set-off region is arranged spaced apart from the overlap plane E.

The fact that a part of the set-off region is arranged spaced apart from an overlap plane E of the overlap region means that all the tolerance positions can be provided without collision. The possibility of conventional sealing, for example with PVC, is nevertheless retained. The need for straight metal sheet overlapping for the tolerance region, which would be necessary for example in the case of a non-angled or non-curved overlap region, is reduced or eliminated. Since this tolerance region is reduced or eliminated, larger undercuts in the side wall may be realized. The undercuts in turn allow smaller surface radii for character edges of the side wall of the motor vehicle body. This makes possible more prominent stylistic features. If the water channel is not in the zero position and overlaps in its tolerance region with the side wall of the vehicle body, at least one support for a sealing compound is provided by the set-off region spaced apart from the overlap plane E. Consequently, PVC can be applied without holes forming between the overlap region and the side wall of the vehicle body, whereby leak-tightness with respect to water is ensured.

In a particularly preferred embodiment, the set-off region is of curved form. This allows the set-off region to be arranged spaced apart from the overlap plane E in a particularly simple manner. Here, the set-off region is preferably curved along a radius.

In a further particularly preferred embodiment, the overlap region and the set-off region are arranged at an angle to one another. This allows the set-off region to be arranged spaced apart from the overlap plane E through simple bending of an additional region of the overlap region. Here, an angle α between the overlap region and the set-off region preferably lies in the range from 5° to 30°. This allows a particularly good reduction of the tolerance region of the water channel side wall and allows particularly small surface radii at the side wall of the vehicle body.

Furthermore, embodiments in which the se-off region is arranged in a curved and angled manner are also conceivable.

Preferably, in all the embodiments, the water channel structure is formed in such a way that, in the motor vehicle, the set-off region is arranged in the region of a character edge of an outer wall of the motor vehicle.

According to a further embodiment, a motor vehicle comprises a water channel structure according to the invention and a motor vehicle body having a side wall.

Embodiments of the invention will be described below on the basis of the Figures.

DETAILED DESCRIPTION OF THE DRAWINGS

Figure 1:
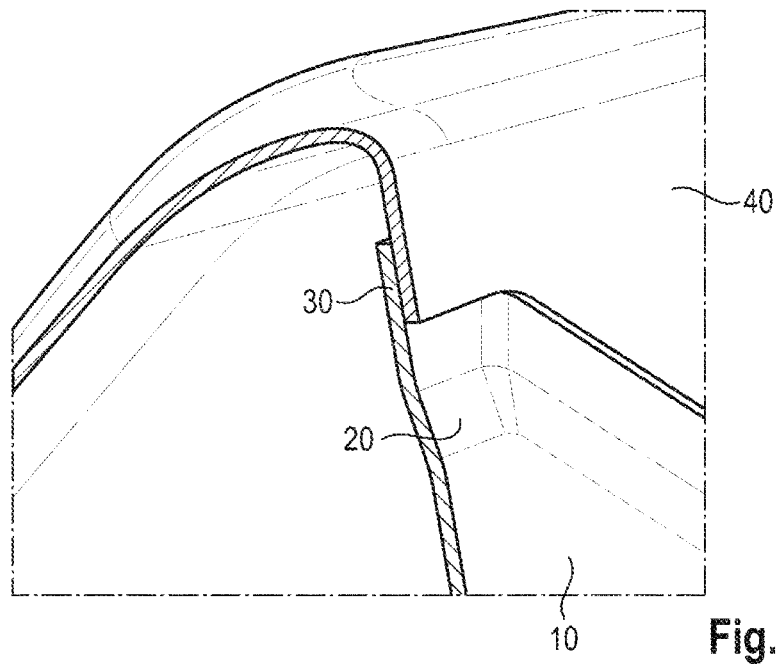
FIG. 1 shows a perspective sectional view of a known water channel structure and of a side wall of a vehicle body.

FIG. 1 shows a known water channel structure 10 and a side wall 40 of a vehicle body. For example, part of the rear-end region of a motor vehicle is illustrated here. In this case, the water channel structure 10 has a water channel side wall 20 with an overlap region 30. The overlap region 30 is arranged in a manner overlapping the side wall 40 of the vehicle body. The water channel structure 10 is in this case fastened, for example by means of spot welding, to the side wall 40 of the vehicle body. Finally, PVC is applied for the purpose of sealing off the water channel shown).

Figure 2:
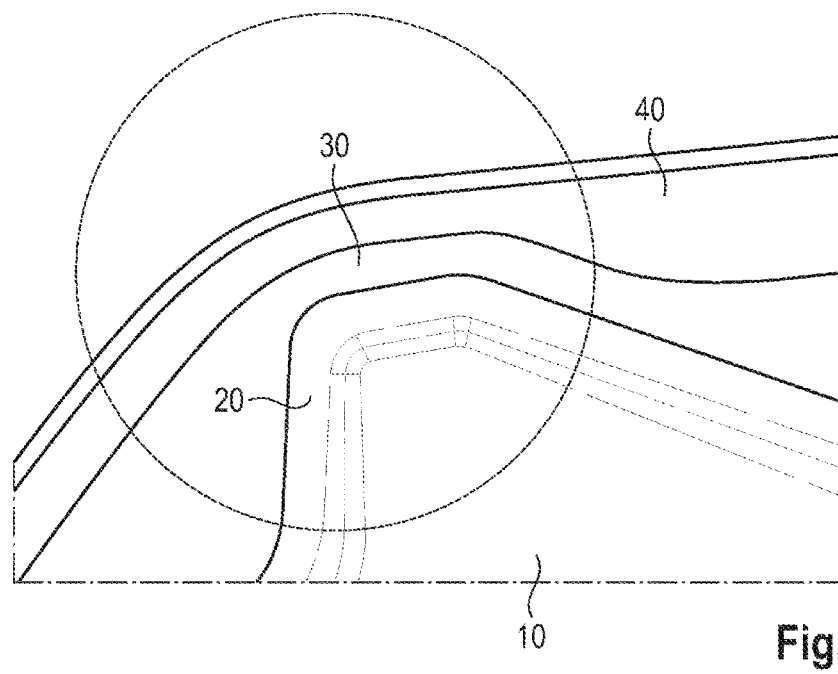
FIG. 2 shows the arrangement of FIG. 1 in a lateral view.

In the lateral view of FIG. 2, as in FIG. 1, both the water channel structure 10, with the water channel side wall 20 and the overlap region 30, and the side wall 40 of the vehicle body can be seen. Furthermore, for clarification, the dashed line shows a relative range for a surface radius in the region of a character edge of the side wall 40 of the body.

Figure 3:
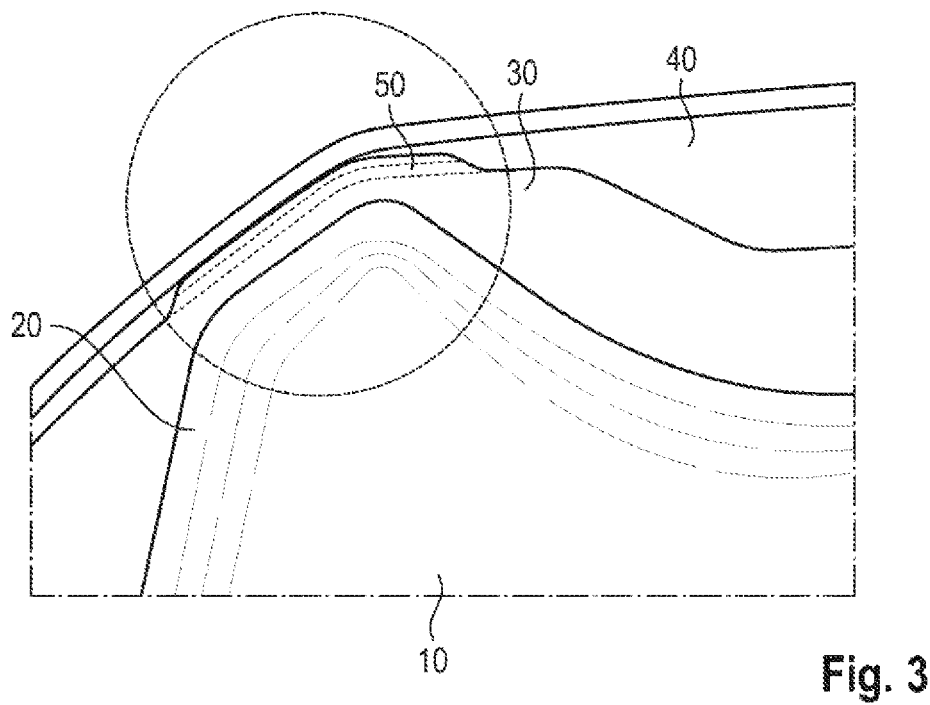
FIG. 3 shows a lateral view of a water channel structure according to the invention and of a transparently illustrated side wall of a vehicle body.

FIG. 3 shows a water channel structure 10 according to the invention which, in addition to the features of FIGS. 1 and 2, has a set-off region 50, which is additionally arranged on the overlap region 30. Preferably, the set-off region 50 and the overlap region 30, for example, are formed from a metal sheet. Furthermore, for clarification, the dashed line shows a relative range for a surface radius, smaller than in FIG. 2, in the region of a character edge of the side wall 40 of the body. Since the set-off region 50 requires no further tolerance region at the side wall 40 of the body, the character edge of the side wall 40 of the body may be formed in a more prominent manner, since larger undercuts are possible.

Figure 4:
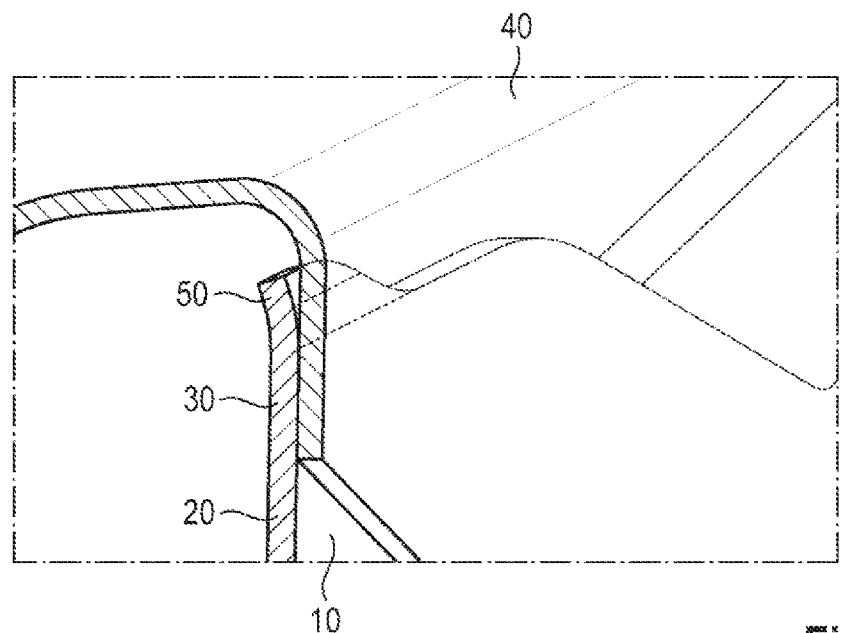
FIG. 4 shows, from the outside toward the vehicle body, a perspective sectional view of the arrangement of FIG. 3.
Figure 5:
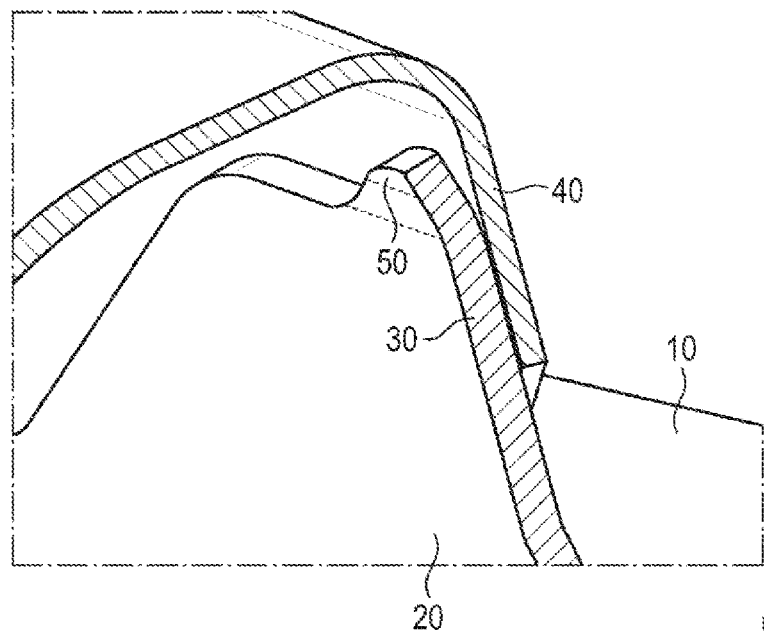
FIG. 5 shows, from the inside toward the vehicle body, a perspective sectional view of the arrangement of FIG. 3.
Figure 6:
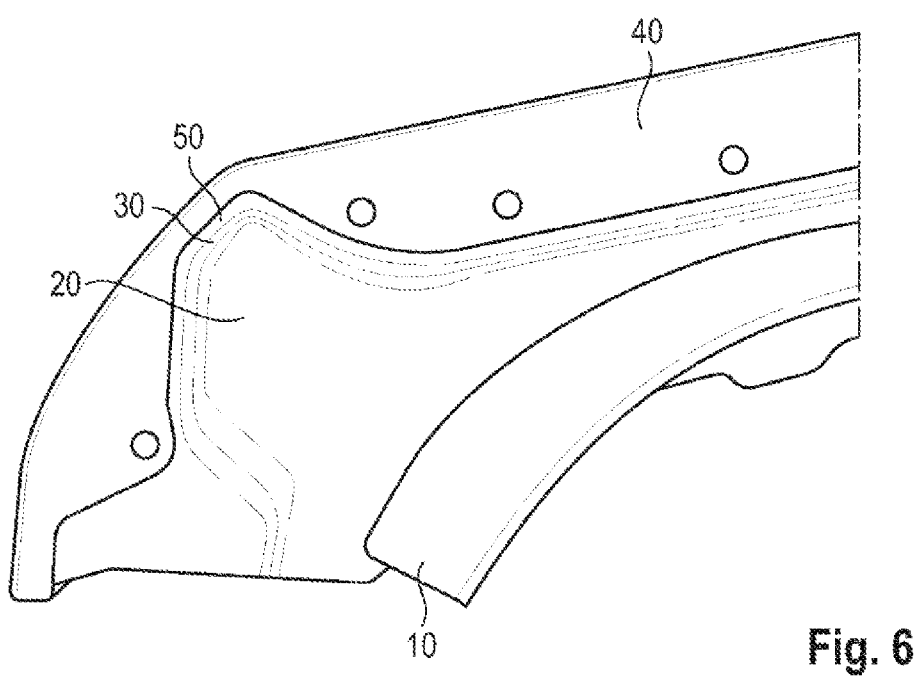
FIG. 6 shows a further lateral sectional view of a water channel structure according to the invention and of a side wall of a vehicle body.

In FIG. 4, it can be seen that the overlap region 30 and the set-off region 50 are arranged at an angle to one another. In the installed state, the set-off region 50 thus points toward the interior of the motor vehicle. This is further illustrated in FIG. 5, FIG. 6 is an enlarged view of FIG. 3, in which the configuration of the water channel structure 10 is more clearly illustrated.

Figure 7:
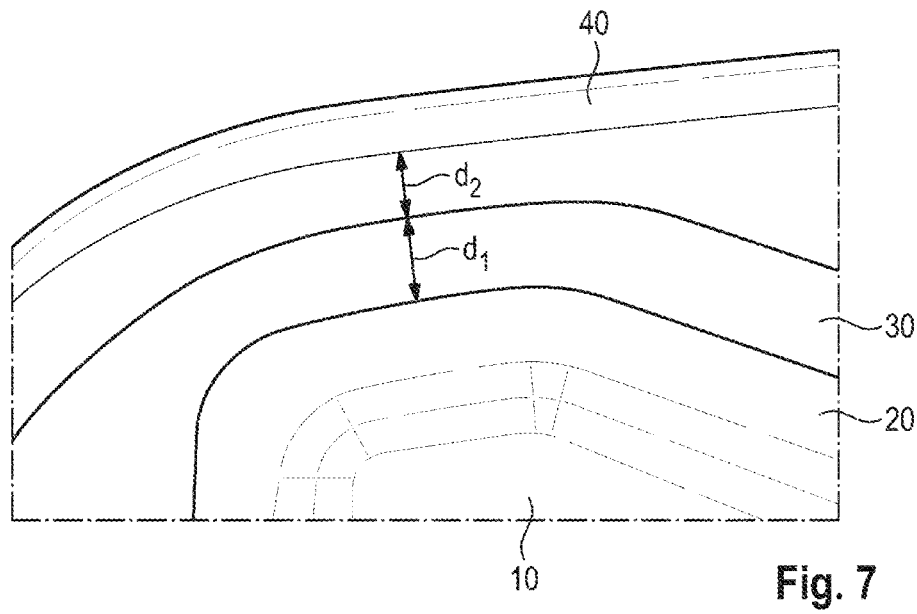
FIG. 7 shows a detail of FIG. 2.

FIG. 7 is an enlarged view of FIG. 2. Here, the overlap region 30 has a length $d_1$. A tolerance length $d_2$ must additionally be provided for tolerance compensation between the side wall 40 and the water channel structure 10.

Figure 8:
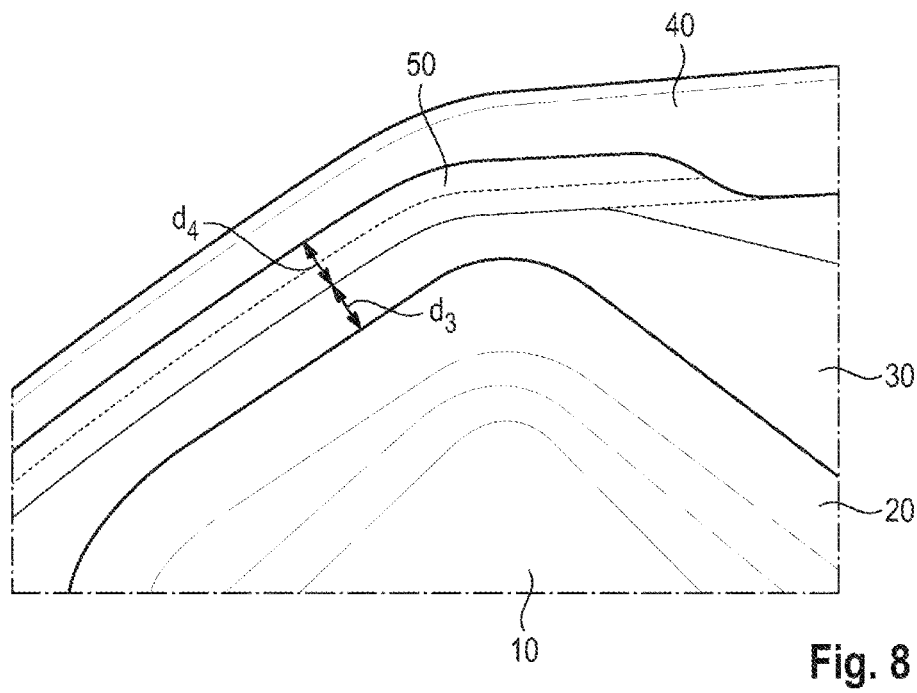
FIG. 8 shows a detail of FIG. 3.

FIG. 8 is an enlarged view of FIG. 3. Here, the overlap region 30 has a length $d_3$. The length $d_3$ is in this case less than or equal to the length $d_1$. Since the set-off region 50 is angled, however, it is not necessary for tolerance compensation in the form of an overlap to be provided for this. The overlap region 30 and the set-off region 50 therefore have a total length of $d_3+d_4$ only. In this case, according to the invention, it holds that $d_3+d_4<d_1+d_2$.

By way of example, $d_1=3.5$ mm, $d_2=3.2$ mm and $d_3+d_4=4$ min may be selected. It goes without saying that other lengths are also possible.

Figure 9:
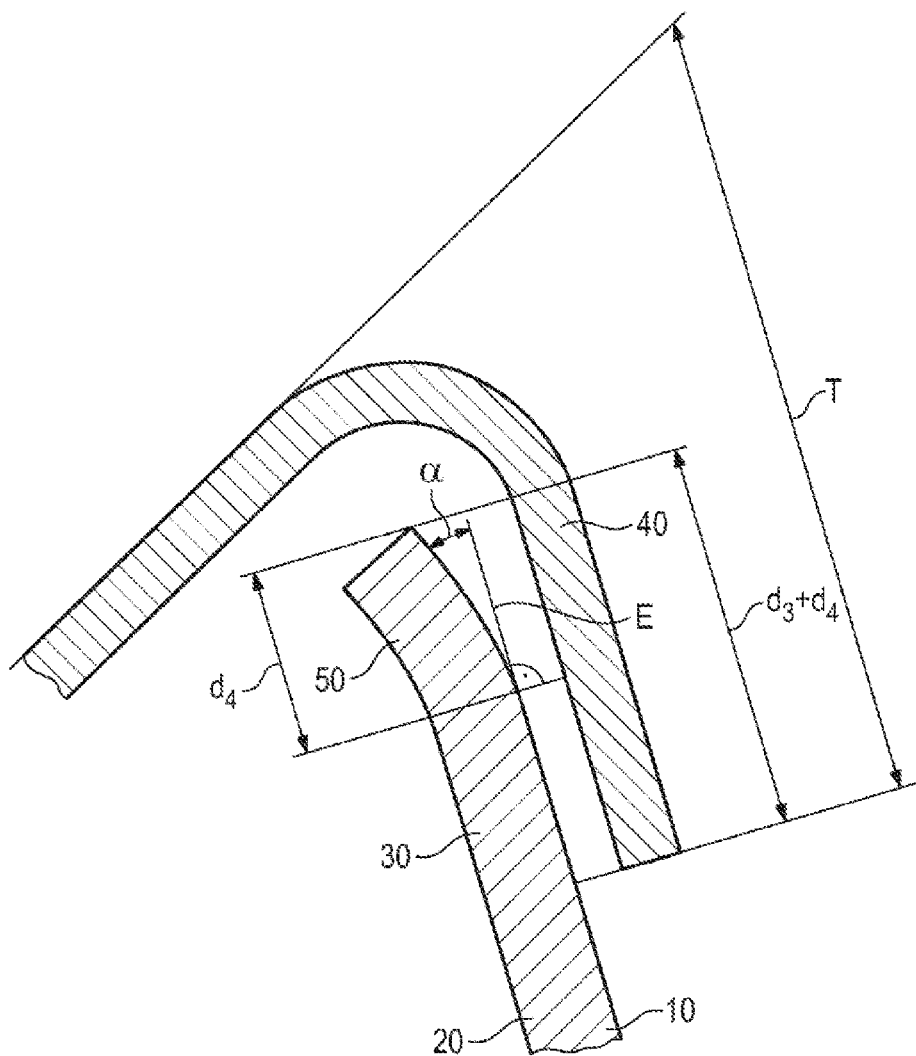
FIG. 9 shows a sectional view of a water channel structure according to the invention and of a vehicle body.

FIG. 9 shows an angle α according to the invention between the overlap region 30 and the set-off region 50. Preferably, the angle α lies in the range from 5° to 30°. Particularly preferably, the angle α lies in the range from 15° to 20°. Alternatively, curvatures, preferably radii, which make possible a similar spacing, are conceivable. Also shown in FIG. 9 is an overlap plane E in which the overlap region 30 and the side wall 40 of the body overlap. The overlap plane E is formed substantially by the overlap region 30. As can be seen in FIG. 9, the angle α is formed between the set-off region 50 and the overlap plane E. According to the invention, as can be seen in FIG. 9, at least one part of the set-off region 50 is arranged spaced apart from the overlap plane E.

The depth T of the set-off can furthermore be seen in FIG. 9. The depth T is the decisive measure for the production of a "sharp, attractively designed" character edge. According to the invention, the depth T of the set-off is reduced with the sealing capability maintained.

For the purpose of the overlap plane E being more clearly visible, the side wall 40 of the body does not abut against the overlap region 30 in FIG. 9. In the installed state, the side wall 40 of the body preferably abuts against the overlap region 30.

Furthermore, the angled-away set-off region 50 simplifies the abutment from below of the water channel 10 against the side wall 40 of the body during joining, since the risk of sheet-metal edges striking one another is reduced.

LIST OF REFERENCE CHARACTERS

10 Water channel structure
20 Water channel side wall
30 Overlap region
40 Side wall of a motor vehicle body
50 Set-off region
E Overlap plane
T Depth of the set-off

What is claimed is:

1. A water channel structure of a motor vehicle, comprising:
a water channel side wall, wherein the water channel side wall has an overlap region and wherein the overlap region is arranged in the motor vehicle overlapping a side wall of a motor vehicle body in an overlap plane; wherein the water channel side wall has a set-off region disposed at a distal end of the water channel side wall and on an end of the overlap region, wherein the set-off region of the water channel side wall is spaced apart from the overlap plane, and wherein the set-off region is disposed within a character edge of the side wall of the motor vehicle body.

2. The water channel structure according to claim 1, wherein the set-off region is curved.

3. The water channel structure according to claim 1, wherein the set-off region is disposed at an angle to the overlap region.

4. The water channel structure according to claim 3, wherein the angle has a range from 5° to 30°.

5. A motor vehicle, comprising:
a motor vehicle body having a side wall; and
a water channel side wall, wherein the water channel side wall has an overlap region and a set-off region, wherein the set-off region is disposed at a distal end of the water channel side wall and on an end of the overlap region, wherein the overlap region overlaps the side wall in an overlap plane, wherein the set-off region of the water channel side wall is spaced apart from the overlap plane, and wherein the set-off region is disposed within a character edge of the side wall of the motor vehicle body.

* * * * *